(12) United States Patent
Mahalingam

(10) Patent No.: US 8,363,798 B2
(45) Date of Patent: Jan. 29, 2013

(54) CUSTOM TELEPHONY DEVICE CONFIGURATION

(76) Inventor: Padmanabhan Mahalingam, Madras (IN)

(*) Notice: Subject to any disclaimer, the term of this patent is extended or adjusted under 35 U.S.C. 154(b) by 335 days.

(21) Appl. No.: 12/909,539

(22) Filed: Oct. 21, 2010

(65) Prior Publication Data

US 2011/0096913 A1 Apr. 28, 2011

Related U.S. Application Data

(60) Provisional application No. 61/253,935, filed on Oct. 22, 2009.

(51) Int. Cl.
*H04M 11/00* (2006.01)
(52) U.S. Cl. .................... 379/90.01; 345/650
(58) Field of Classification Search .......... 379/90.01; 707/805; 715/700–866; 455/556.2
See application file for complete search history.

(56) References Cited

U.S. PATENT DOCUMENTS

| | | | | |
|---|---|---|---|---|
| 7,620,951 | B2 * | 11/2009 | Brokenshire et al. | 718/100 |
| 7,895,530 | B2 * | 2/2011 | Leavitt et al. | 715/810 |
| 2007/0099659 | A1 * | 5/2007 | Borquez et al. | 455/556.2 |
| 2008/0172610 | A1 * | 7/2008 | Blair | 715/700 |
| 2008/0263174 | A1 * | 10/2008 | Manson et al. | 709/217 |
| 2008/0276182 | A1 * | 11/2008 | Leow | 715/740 |
| 2010/0131893 | A1 * | 5/2010 | Weisscher et al. | 715/810 |
| 2010/0287469 | A1 * | 11/2010 | Wang et al. | 715/702 |
| 2011/0090151 | A1 * | 4/2011 | Huang et al. | 345/168 |
| 2011/0298596 | A1 * | 12/2011 | Warrick | 340/12.53 |

* cited by examiner

*Primary Examiner* — Curtis Kuntz
*Assistant Examiner* — Maria El-Zoobi
(74) *Attorney, Agent, or Firm* — Donald R. Boys; Central Coast Patent Agency, Inc.

(57) ABSTRACT

A system for providing highly-customized telecom devices has a variety of standardized component parts, a library of device-specific software providing a variety of functions, including soft keys and icons related to soft keys, and an interactive interface provided by software executing from a machine-readable medium coupled to an Internet-connected server. The interactive interface provides functions for a person to indicate to the system a combination of needs and personal characteristics, the system illustrates to the person special features associated with the combination of needs indicated, and the person is enabled to select to configure a telecom device with individual ones of the special features.

16 Claims, 4 Drawing Sheets

| | Children | Pets | Valuables | Arthritic | Physical | Vision | Hearing | Speech | Mental | 50-70 | 70-90 | 90+ |
|---|---|---|---|---|---|---|---|---|---|---|---|---|
| Product features | | | | | | | | | | | | |
| Large kB | | | | | | | | | | X | X | |
| Lighted kB | | | | | | | | | | | | |
| Limited keys | X | X | | | | | | | X | | | X |
| Emergency button | X | X | X | | X | X | X | X | X | | X | X |
| Finder call | X | X | | | | X | | | X | | | X |
| Large display | | | | | | X | | | | X | X | X |
| Torch | X | | | X | | | | | | X | X | X |
| Appropriate menu | | | | | | | | | | | | |
| speed dial | X | | | X | X | X | X | X | X | X | X | X |
| handsfree | X | X | | | | X | | | X | X | X | X |
| speakerphone | X | X | | X | X | | | | | X | X | X |
| voice activation | X | | | X | X | X | | | | | | |
| TTS | | | | | | X | | | | | | |
| Flasher | | | X | | | | X | | | | | |
| Auto SMS | X | X | X | X | X | X | X | X | X | X | X | X |
| Vibrator | X | X | X | X | X | X | X | X | X | X | X | X |
| GPRS | X | | | | | | | | | X | X | X |
| MP3 player | | | | | | | | | | X | X | |
| FM radio | | | | | | | | | | X | X | X |
| Multiregion | | | | | | | | | | | | |
| Network features | | | | | | | | | | | | |
| Theft proof | X | X | X | X | X | X | X | X | X | X | X | X |
| Settings backup | X | X | | X | X | X | X | X | X | X | X | X |
| Position tracking | X | X | X | | | | | | X | X | X | X |
| Remote scheduler | X | | | | | | | | X | X | X | X |
| Live support | X | X | X | X | X | X | X | X | X | | | X |

*Fig. 3*

CUSTOM TELEPHONY DEVICE CONFIGURATION

CROSS-REFERENCE TO RELATED DOCUMENTS

The present invention is a Non-Provisional application of U.S. Provisional application 61/253,935, filed on Oct. 22, 2009. The disclosure of priority application is incorporated herein at least by reference.

BACKGROUND OF THE INVENTION

1. Field of the Invention

The present invention is in the field of ecommerce and pertains particularly to methods and apparatus for interfacing with special needs consumers, consumer advocates and doctors and other medical person to enable custom configuration and ordering of communications devices that meet certain needs of a user.

2. Discussion of the State of the Art

In the field of ecommerce, companies sell products through Websites to consumers. This method of interfacing with consumers is practiced in addition to telephone sales, order desks and walk-in order desks. Electronics devices such as communications devices, including cellular telephones, typically have form factors that vary little if at all, and consumers purchase these devices based on pricing and available features.

It is known in the art to provide an interactive interface enabling a client to browse features of a product for sale, and to configure a product using available features, and then to order the product. Automobile manufacturers, for example, have web sites where a potential customer may select a model, select among engine options, tire options, color options, upholstery options, and the like to configure an automobile for purchase, and then place an order for the customized automobile. This sort of selective variability in features is not widely available, however, in the area of telephony devices, such as cellular telephones.

The inventor has identified a problem in the art of communications device marketing and manufacturing in that these products are not user friendly to persons that have special needs and cannot use, or have some trouble using existing features of such devices. For example, a person that has dexterity problems may require a communications device that is larger and has larger keys on a keypad. A person with hearing issues may require a communications device with a higher range of volume, or a device with entry by Braille. A person with neuropathy in the hands and fingers may require a touch screen with less sensitivity than is typically provided in touch screens.

Special needs described above deter or prevent many potential consumers from ordering or using communications devices from companies having limited choices of available features.

Therefore, what is clearly needed is an enterprise that can provide telephony devices with a wide variety of special features for persons with special needs, and an interface allowing selection and configuration of devices among the variety of available features.

SUMMARY OF THE INVENTION

In a preferred embodiment of the invention a system for providing highly-customized telecom devices is provided, comprising a variety of standardized component parts, a library of device-specific software providing a variety of functions, including soft keys and icons related to soft keys, and an interactive interface provided by software executing from a machine-readable medium coupled to an Internet-connected server. The interactive interface provides functions for a person to indicate to the system a combination of needs and personal characteristics, the system illustrates to the person special features associated with the combination of needs indicated, and the person is enabled to select to configure a telecom device with individual ones of the special features.

In one embodiment the features comprise physical features, touch screen features, and services to be provided through the telecom device. Also in one embodiment the interactive interface provides functionality for the person to purchase the telecom device once configured. In some embodiments the system makes and retains a copy of individual configurations associated with individual persons, and cross-references like configurations. In some cases a backup telecom device is produced and saved in case of replacement need by the person to whom the device is associated.

In one embodiment the system further comprises connection to a cellular network and a group of agents accessible through the cellular network, the agents especially trained to interact with persons calling in according to needs indicated by identification of the telecom device associated with the person.

In one embodiment one of the available special features is automatic and periodic reminding. Also in one embodiment overall unit dimensioning is one of the available special features.

In another aspect of the invention a method for providing highly-customized telecom devices is provided, comprising the steps of (a) providing a variety of standardized component parts; (b) storing device-specific software providing a variety of functions, including soft keys and icons related to soft keys in a software library; and (c) providing an interactive interface by software executing from a machine-readable medium coupled to an Internet-connected server, the interactive interface providing functions for a person to indicate to the system a combination of needs and personal characteristics, the system illustrates to the person special features associated with the combination of needs indicated, and the person is enabled to select to configure a telecom device with individual ones of the special features.

In one embodiment of the method the features comprise physical features, touch screen features, and services to be provided through the telecom device. Also in an embodiment the interactive interface provides functionality for the person to purchase the telecom device once configured.

In some embodiments the system makes and retains a copy of individual configurations associated with individual persons, and cross-references like configurations. In one embodiment a backup telecom device is produced and saved in case of replacement need by the person to whom the device is associated.

In some cases the system further has connection to a cellular network and a group of agents accessible through the cellular network, the agents especially trained to interact with persons calling in according to needs indicated by identification of the telecom device associated with the person. One special feature is automatic and periodic reminding. Further, overall unit dimensioning is one of the available special features.

BRIEF DESCRIPTION OF THE DRAWING FIGURES

FIG. 3 is an exemplary mapping of needs to special features.

DETAILED DESCRIPTION

The inventor provides a unique interface, methods and products that enable custom order of special features and settings for a communications device, wherein such features and settings address one or more special needs of a user. The methods and apparatus of the present invention are enabled using the following examples, which may describe more than one embodiment of the present invention.

Figure 1:
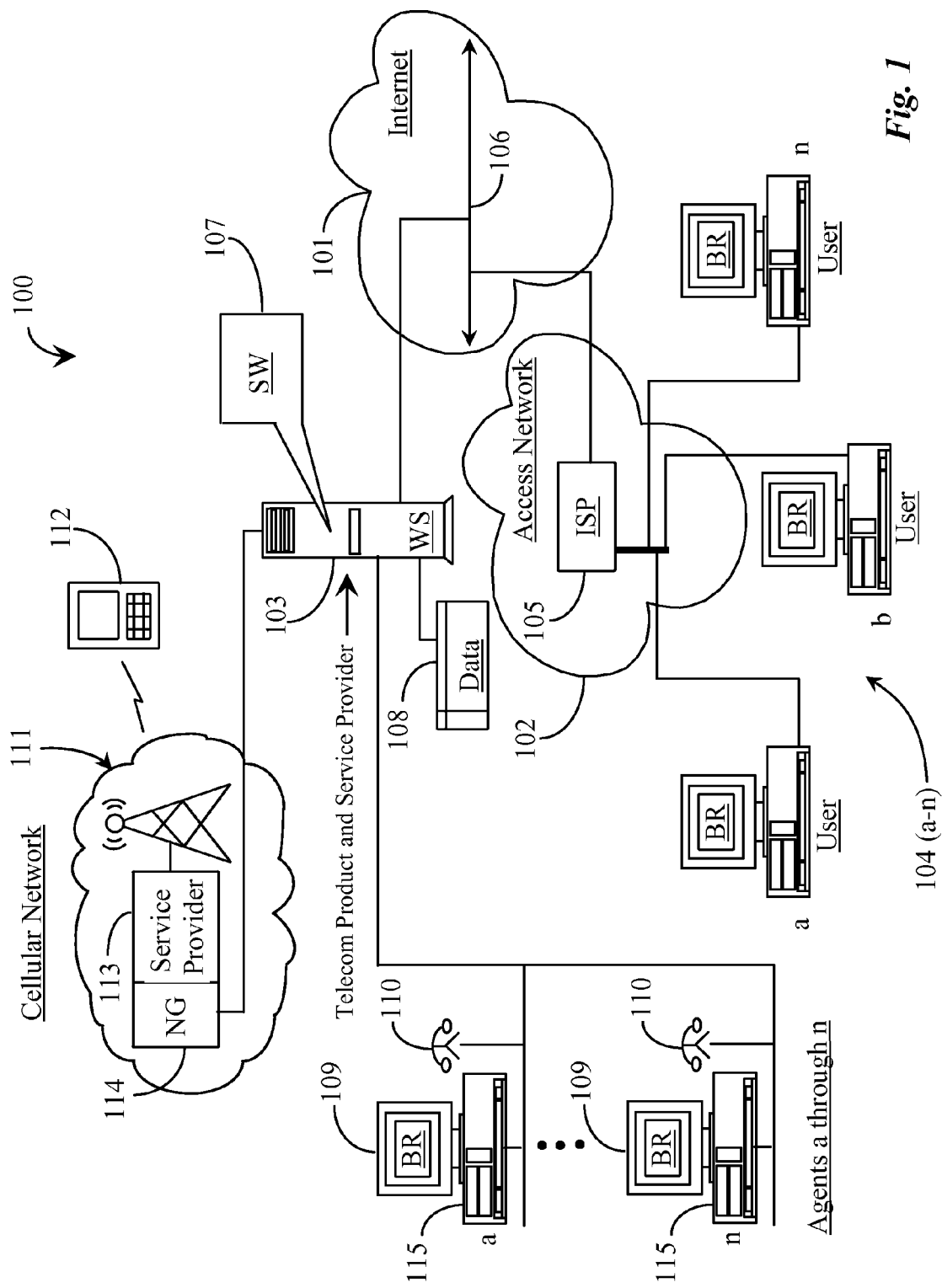
FIG. 1 is an architectural view of a network connected telecom product and service provider in an embodiment of the invention.

FIG. 1 is an architectural view of a communications network 100 enabling ecommerce custom order of a communications device according to an embodiment of the present invention. Communication network 100 includes the well-known Internet network illustrated herein by a network cloud 101 and further exemplified by an Internet backbone 106. Internet backbone 106 represents all of the equipment, lines and access points that make up the Internet network as a whole including any connected sub networks. Therefore there are no geographic limitations to the practice of the present invention.

Network 100 also includes an exemplary access network 102, which might be a public switched telephone network (PSTN), a wireless cellular network (CDMA-based), a Local-Area-Network (LAN), or some other intermediate or carrier network accessed prior to Internet connection. Access network 102 includes an Internet service provider (ISP) 105. ISP 105 is a third-party service provider that enables users to access Internet network 101. ISP 105 may be a wired or wireless ISP. Users are illustrated herein as users 104 (a-n). Each user is illustrated by a personal computer (PC) icon in this example however users may connect online using any suitable Internet appliance including hand-held devices such as smart phones or personal digital assistants (PDAs), desktop computers, or Laptop computers.

A Web server (WS) 103 is provided in this example and maintained by a Telecom Product Service Provider, which is a company in one embodiment that manufactures and provides communications devices like cellular telephones for example. In this embodiment the devices are specialized for persons having certain needs.

Web server 103 has a digital repository 108 coupled thereto for storing all of the software and data required to enable server functions. WS 103 may be maintained by a third-party Web hosting service in one embodiment. Web server 103 is connected to Internet backbone 106. ISP 105 is connected to Internet backbone 106 by a high-speed access line. ISP 105 may be a provider of such Internet services as digital subscriber line (DSL), cable/modem, dial-up modem, satellite services, or wireless fidelity (WiFi). Other Internet connection services may be available to users 104 (a-n) without departing from the spirit and scope of the present invention. Each user 104 (a-n) accesses network 10, more particularly, WS 103 using a browser application (BR) as is typically known in the art of Web browsing.

Data repository 108 in this embodiment holds data such as Web data, client data, customer data, service data, and any other types of data that may be accessed through WS 103 by users and by authorized individuals. Service provider 103 executes software (SW) 107 that provides all server functions, including a company Website, including ordering functions (not shown in FIG. 1) that may be accessed by users desiring to configure a communications device according to a variety of options, and place an order for a specific communications device. In one embodiment the communications devices typically manufactured and made available to consumers by a device/system manufacturer include cellular telephones, and similar communications handheld devices.

In use of the present invention, users 104 (a-n) may navigate to the service provider website and request services. Users may then determine to place a special order for a cellular telephone for example, wherein specific features and settings may be selected or configured in place of what may be considered standard features and settings from other providers. Configuration pages and order pages are interactive interfaces that allow a potential customer to place an order for a communications device that includes one or more features or settings that may address one or more special needs of the user relative to how the phone feels, looks, and operates.

In one embodiment, wherein one person may not be able to interact with an interface for configuring or ordering, an authorized agent may logon and configure and order a device for that person. Such as agent might be a relative, an employer, friend, a doctor, an ophthalmologist, a psychiatrist, or any other individual. Available features for custom phone orders may include features that provide some advantage to or otherwise addresses special needs of a person. For example, the size and arrangement, including proliferation of device keys might be one feature that can be customized for a user with special needs. Other such features and settings are described below in this specification.

Figure 2:
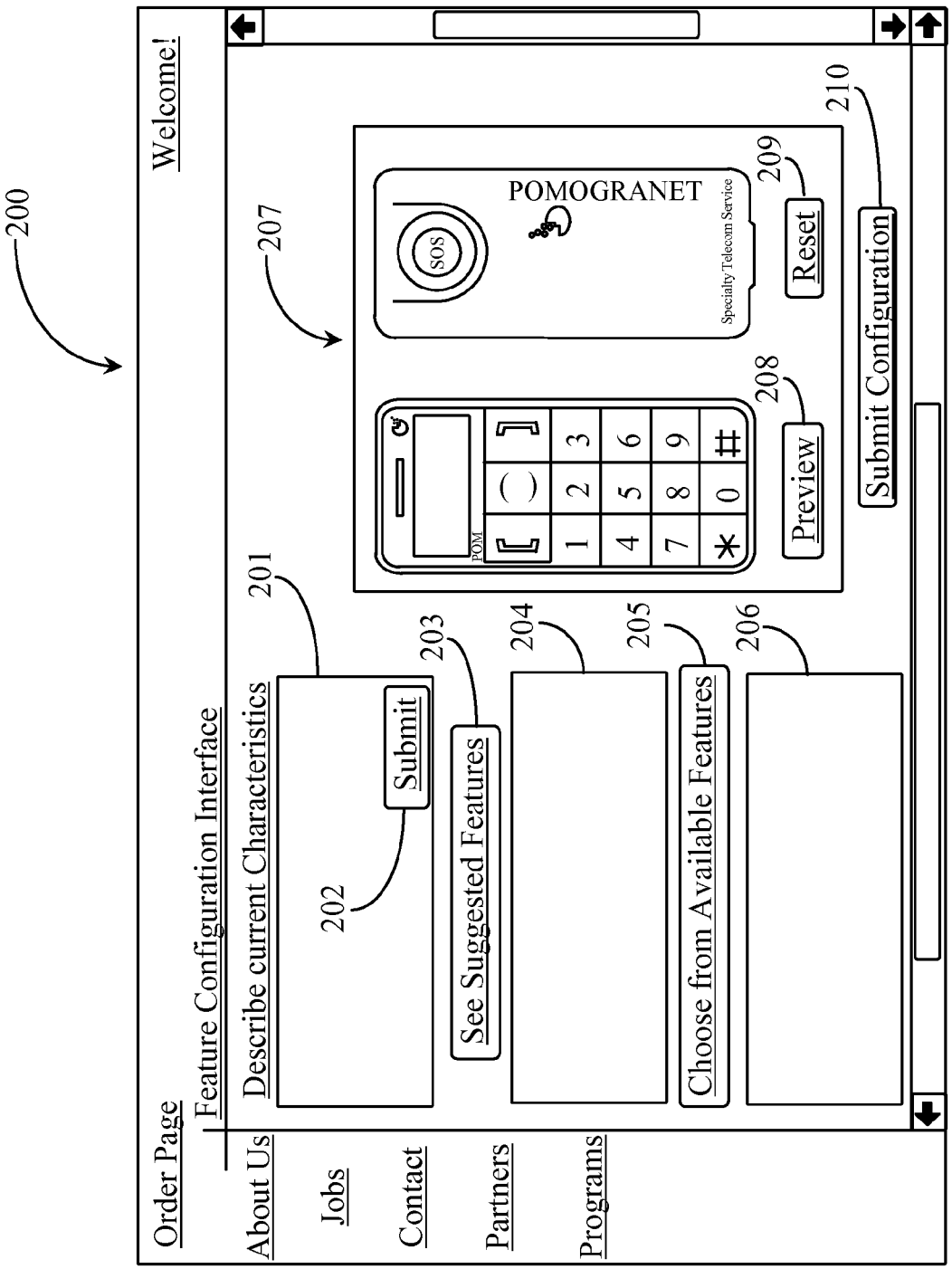
FIG. 2 is an exemplary interactive interface according to an embodiment of the invention.

FIG. 2 is an exemplary interface 200 that might be used for configuring a communications device according to an embodiment of the present invention. Interface 200 may be invoked through functions of SW 107 introduced above. As an ecommerce Website, it may be expected that shopping cart apparatus and order information forms are part of the apparatus of an ordering procedure. Interface 200 in this example includes side-bar navigation links such as might be found on a Web page, including links "About Us", "Jobs", "Contact", "Partners", and "Programs". There may be fewer or more navigation links of various types without departing from the spirit and scope of the present invention.

As described above, the Telecom Product and Service Provider that hosts server 103 is dedicated to providing services and products for persons that in many cases have special needs. Some of such needs may be simply needs that generally become apparent as a person ages. The features that a person of twenty to thirty years of age might need in a cellular telephone, for example, may be different than the features a person might need in their fifties. A person past seventy may have different needs, and a person past ninety different needs yet. The person in their fifties might have needs focused on convenience and simplicity, the person in seventies may have needs focused on safety and programmed support, and the person in nineties may have needs focused on access, security, agent support, and monitoring.

In the following it should be remembered that modern-day communication devices typically provide texting services as well as speech services. A person who is challenged visually may require keys on a device, or softkeys in a touch screen device, that are larger than normal, to be able to see the keys, and to be able to activate the keys. A person who is arthritic may also need larger than normal keys. A person who is blind may need special key input utilizing Braille, Morse code or semaphore input, and may also have need for speech-to-text input. Speech-to-text may be useful for other persons as well. A person hearing-challenged may need speakerphone with louder than usual volume, or a coupling to an earphone as a hearing aid. A person who has speech difficulty or may be entirely mute may have need for a teletypewriter input, a Braille input, or some other form of text input, and may have use for text-to-speech features.

FIG. 3 is an exemplary chart of features vs. characteristics of a user, an exemplary requirements grid. This matrix may vary, and may not include every combination and mapping that may be important, and the list of features, though extensive, may not represent all features that may be offered.

Returning to FIG. 2, in this example, interface 200 is a feature configuration interface that enables a user to select available features and settings to be included in an order of a communications device, such as a cellular telephone. Interface 200 may include a data entry box or field 201 that allows a user or agent for a user, or a medical person, for example, to describe a person's characteristics, for whom a device may be configured. The person entering the information may type in the characteristics, or alternatively, the system may display check boxes which may be selected, with characteristics like vision, age, hearing, etc. Submit button 202 sends the entered data to a suggestion wizard (not illustrated). The wizard is software that may, for example, consult a matrix like that of FIG. 3, and return suggested features and settings based on the parsing of what was typed in or selected as personal characteristics.

An interactive option 203 is provided that enables the person or agent to review available features, and association of features to characteristics. In this case, if the user or user-agent is satisfied that the suggested features and settings will adequately address one or more special needs of the user then the configuration process may be complete and the order for a phone with those features and setting may be placed with the service provider.

Available features may include any physical features and operational features including any applicable settings. Custom features and associated settings may include but are not limited to key size; voice recognition; remote access by one or more trusted users; display size; GPS location capability; automatic or periodic reminding; key sensitivity; touch screen sensitivity; touch screen or display size; and overall unit dimensioning. Many other features and associated settings might be available for custom application as well.

A text display box 204 is provided below option 203 and is adapted to display any suggested features after a user invokes option 203. An interactive option 205 is provided in this example and enables a user to choose from an array of available features rather than having the system suggest available features. Invoking option 206 caused all of the available features to appear in text box 206. In one embodiment a remote access feature enables any user that is trusted to access the user's communications device remotely for the purpose of setting appointments configuring reminders, and so on.

In this example a configuration preview window 207 is provided and is adapted to display the communications device with one or more configurations in preview mode, meaning that the display shows what the device will look like with certain selected features. For example, a user may select one or more features from available features displayed in box 206. The communications device preview pane 207 displays the device with the selected features if the user selects the preview option 208. A reset is provided enabled by reset button 209.

Preview option 208 enables the person or agent to preview the phone with specific features enabled. If the person or agent does not like one or more features, a reset option is provided that when invoked returns the device in display back to standard configuration or the basic features that come with the communications device. An interactive option 210 is provided and adapted to enable a user to submit a finished communication. In this example the communications device is a cellular telephone. The device is displayed in both front view and rear view in this example.

Interface 200 is a Web interface in this example. In one embodiment Web interface 200 may be input for a voice browsing application connected to an interactive voice response (IVR) unit. In that case a user may browse the interface using an IVR system. In one embodiment interface 200 is a desktop or counter top form that a user may take and physically fill out to order a custom communications device. In this case the user or a user agent may fill the form at the location where such communications devices are sold.

Some available devices may have a physical keyboard, and some may have a touch screen. The touch screen interface is especially amenable to a variety of options for input, soft key size, overlays and the like. For example, options may include providing a photo of the person to be associated with and using the device. A description of special needs may be included to inform any person who may interface with the person certain information that may be helpful to the person. For example, a person with a particular medical condition may have a screen that provides instructions to anyone who may encounter this person in distress. A child's address may be included. There may be a special button someone may activate to send a message to an agent for the person, or a relative, also useful for a lost child, or a lost person who has dementia. An icon library is provided for touch screen features, that may include icons related to religion, culture, language, and so on. A wide variety of language choices are provided for display. Options can be provided for announcing the date and time, in large letters and vocally as well. There are many, many possibilities.

Figure 4:
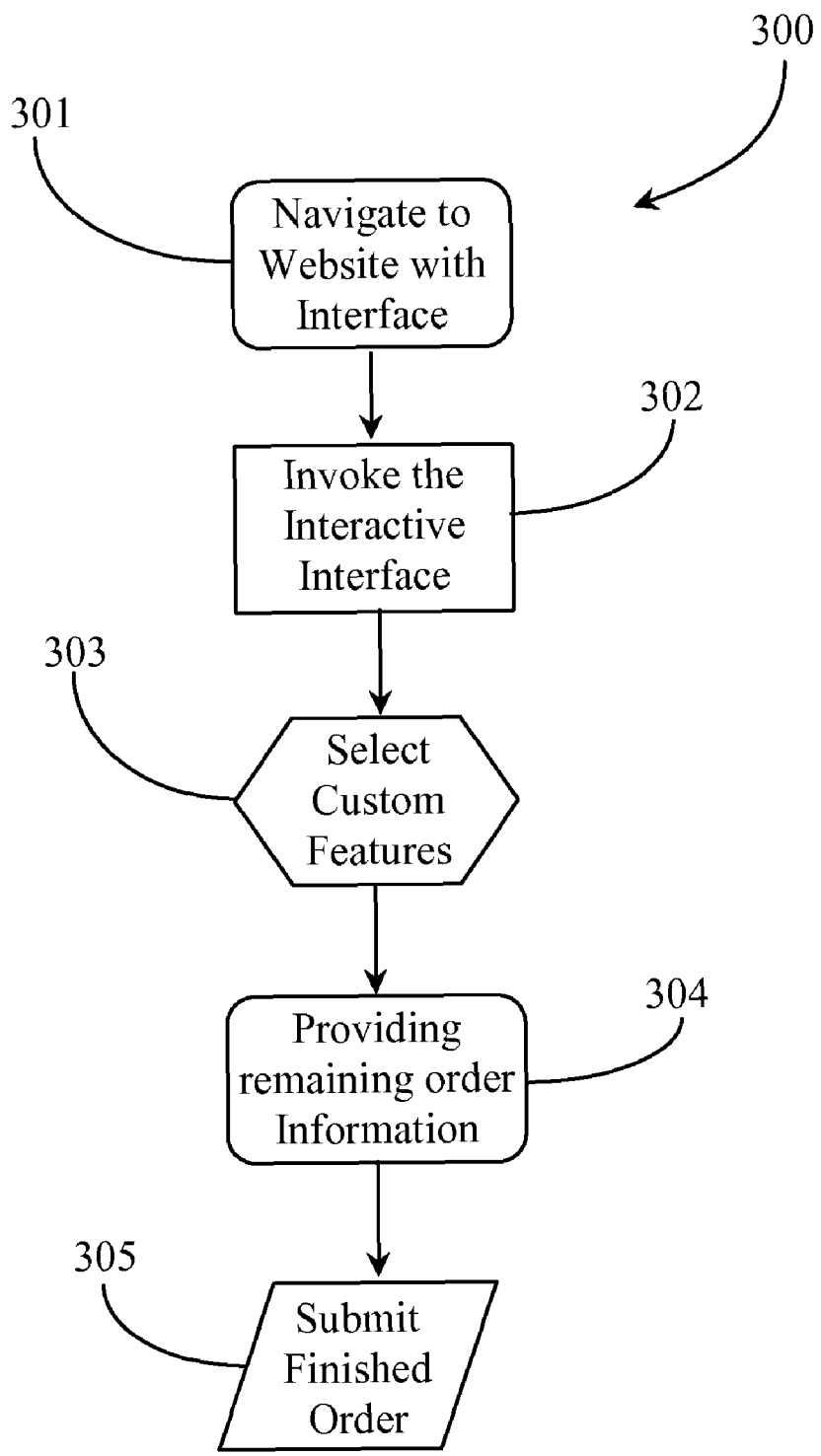
FIG. 4 is a simple flow chart depicting the acts of configuring and ordering a telecom device.

FIG. 4 is a process flow chart 300 illustrating steps for ordering a communications device according to an embodiment of the present invention. At step 301 a user or user agent may navigate to a Website such as Website 107 with the intent of placing a special order for a communications device. Step 301 may be a step for phoning into an IVR system where IVR prompting is used to configure the order. In this process a Web interface is used.

At step 302 the user or user agent invokes an interactive order interface on the Website such as interface 200 previously described. At step 303, the user may select custom features. Custom features are features available to the communications device, but they are features that a special needs individual may desire in a communications device. In step 303 the user or user agent may select one or more features and may preview those features before applying them to the order.

After the user or user agent is finished applying the desired features and settings, the user or user agent may submit the rest of the order information such as credit card information, contact information, shipping address, and so on in step 304. At step 305 the user may submit the finished order.

Returning now to FIG. 1, a cellular network 111 is illustrated, comprising a service provider 113 connected through an appropriate network gateway (NG) 114 to server 103. Device 112 is meant to represent a cellular telephone that may have been configured and provided through the services of the host of server 103. Stations 109 a through n represent Agents 109 are equipped with computers 115 and telephone devices 110, and are organized and enabled to perform certain functions on behalf of a person associated with device 112. Agents 109 may have access to considerable data and information stored, for example, in repository 108. Many interactive features may be provided for persons using devices 112, such as position oriented information as where to find a hospital or other services. Other services may include reporting lost or stolen devices, and replacement with full feature activation. A service that may be provided is a replacement copy of the configured device, and a special overnight delivery for replacement. There may also be many services provided through automated interfaces, such as IVR. The agent-oriented services in many cases are provided to interact with special-needs persons, who may be challenged to deal with automated interfaces. When a person calls in to an agent 109, the device is identified, which also identifies many of the special needs of the person. Agents are trained to interact with persons with special needs, and rapid call transfers are enabled to be sure the person calling is connected to an agent trained to interact with persons having certain special needs.

In another embodiment of the invention special features may be provided to commercially-available communication devices by downloading software. In this embodiment one might access special software at the enterprise site, that is prepared for and compatible with, for example, a Blackberry™ device or an iPhone™. As an example, for a device operable through a touch screen, special interactive display interfaces may be provided for certain purposes, such as for people who might be hearing or sight challenged, and so forth. In this aspect it is not necessary that the features be provided for a proprietary device provided by the same enterprise that provides the enhancement or enhancements.

It is not possible, of course, to detail every feature and every combination of features that may be made available. The examples described herein are meant to represent at least a subset of all the sorts of features that may be made available to be configured to each person with a certain combination of special needs.

It will be apparent to one with skill in the art that the custom order system of the invention may be provided using some or all of the mentioned features and components without departing from the spirit and scope of the present invention, and that there may be many more features available. Although not illustrated or described, the overall system provided by the specialty telecom service includes warehousing of parts, storage of standard software of many sorts, and ability to quickly and efficiently assemble, activate, and ship devices to persons and organizations according to the configuration entered and verified through the custom order interface described. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for providing highly-customized telecom devices, comprising: a variety of standardized component parts;
a library of device-specific software providing a variety of functions, including soft keys and icons related to soft keys; and
an interactive interface provided by software executing from a non-transitory machine-readable medium coupled to an Internet-connected server;
wherein the interactive interface provides functions for a person to indicate to the system a combination of needs and personal characteristics, the system illustrates to the person special features associated with the combination of needs indicated, and the person is enabled to select to configure a telecom device with individual ones of the special features.

2. The system of claim 1 wherein the features comprise physical features, touch screen features, and services to be provided through the telecom device.

3. The system of claim 1 wherein the interactive interface provides functionality for the person to purchase the telecom device once configured.

4. The system of claim 1 wherein the system makes and retains a copy of individual configurations associated with individual persons, and cross-references like configurations.

5. The system of claim 3 wherein a backup telecom device is produced and saved in case of replacement need by the person to whom the device is associated.

6. The system of claim 1 further comprising connection to a cellular network and a group of agents accessible through the cellular network, the agents especially trained to interact with persons calling in according to needs indicated by identification of the telecom device associated with the person.

7. The system of claim 1 wherein one of the available special features is automatic and periodic reminding.

8. The system of claim 1 wherein overall unit dimensioning is one of the available special features.

9. A method for providing highly-customized telecom devices, comprising the steps of: (a) providing a variety of standardized component parts;
(b) storing device-specific software providing a variety of functions, including soft keys and icons related to soft keys in a software library; and
(c) providing an interactive interface by software executing from a non-transitory machine- readable medium coupled to an internet-connected server, the interactive interface providing functions for a person to indicate to the system a combination of needs and personal characteristics, the system illustrates to the person special features associated with the combination of needs indicated, and the person is enabled to select to configure a telecom device with individual ones of the special features.

10. The method of claim 9 wherein the features comprise physical features, touch screen features, and services to be provided through the telecom device.

11. The method of claim 9 wherein the interactive interface provides functionality for the person to purchase the telecom device once configured.

12. The method of claim 9 wherein the system makes and retains a copy of individual configurations associated with individual persons, and cross-references like configurations.

13. The method of claim 11 wherein a backup telecom device is produced and saved in case of replacement need by the person to whom the device is associated.

14. The method of claim 9 further comprising connection to a cellular network and a group of agents accessible through the cellular network, the agents especially trained to interact with persons calling in according to needs indicated by identification of the telecom device associated with the person.

15. The method of claim 9 wherein one of the available special features is automatic and periodic reminding.

16. The method of claim 9 wherein overall unit dimensioning is one of the available special features.

* * * * *